(12) United States Patent
Yoshizawa et al.

(10) Patent No.: US 12,443,122 B2
(45) Date of Patent: Oct. 14, 2025

(54) INFORMATION PROCESSING METHOD

(71) Applicant: FUJIFILM Corporation, Tokyo (JP)

(72) Inventors: Hirotoshi Yoshizawa, Kanagawa (JP); Shinichiro Sonoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 730 days.

(21) Appl. No.: 17/868,784

(22) Filed: Jul. 20, 2022

(65) Prior Publication Data

US 2022/0357681 A1    Nov. 10, 2022

Related U.S. Application Data

(63) Continuation of application No. PCT/JP2021/001732, filed on Jan. 19, 2021.

(30) Foreign Application Priority Data

Jan. 28, 2020    (JP) .................................. 2020-011774

(51) Int. Cl.
G03G 15/04     (2006.01)
G03F 7/00      (2006.01)
G03G 21/18     (2006.01)

(52) U.S. Cl.
CPC ........... G03G 15/04 (2013.01); G03F 7/0022 (2013.01); G03G 21/1853 (2013.01)

(58) Field of Classification Search
CPC .. G03G 15/04; G03G 21/1853; G03G 15/043; G03G 15/5062; G03F 7/0022;
(Continued)

(56) References Cited

U.S. PATENT DOCUMENTS 8,743,317 B2    6/2014   Shiota et al.
9,126,396 B2    9/2015   Degani et al.
(Continued)

FOREIGN PATENT DOCUMENTS

CN    102043281    5/2011
JP    H11282092    10/1999
(Continued)

OTHER PUBLICATIONS

Office Action of Japan Counterpart Application, with English translation thereof, issued on May 9, 2023, pp. 1-6.
(Continued)

*Primary Examiner* — Caleen O Sullivan
(74) *Attorney, Agent, or Firm* — JCIPRNET

(57) ABSTRACT

An information processing method comprising: exposing a correction image displayed on an image display device having a plurality of pixels to a photosensitive recording medium via a limiting member, the limiting member being provided between the image display device and an exposure surface of the photosensitive recording medium and limiting an angle of light emitted from the image display device to the photosensitive recording medium; acquiring recorded image data, which is data of a recorded image recorded on the photosensitive recording medium through the exposure of the correction image; and deriving a correction coefficient K for correcting a pixel value for each pixel of a display image for each pixel of the image display device based on the recorded image data such that the display image including unevenness of which brightness is complementary to unevenness that occur in the recorded image is displayed on the image display device.

13 Claims, 14 Drawing Sheets

(58) Field of Classification Search
CPC .. G03F 7/2051; G03B 27/04; G02B 2207/123
USPC .......................................................... 430/21
See application file for complete search history.

(56) References Cited

U.S. PATENT DOCUMENTS

| | | | |
|---|---|---|---|
| 11,361,412 B2* | 6/2022 | Yoshizawa | G03B 27/32 |
| 12,047,684 B2* | 7/2024 | Yoshizawa | H04N 23/10 |
| 2011/0085182 A1 | 4/2011 | Shiota et al. | |
| 2015/0003853 A1 | 1/2015 | Nakagawa et al. | |
| 2019/0286005 A1 | 9/2019 | Nishina et al. | |
| 2020/0394768 A1 | 12/2020 | Yoshizawa et al. | |

FOREIGN PATENT DOCUMENTS

| | | |
|---|---|---|
| JP | 2008096856 | 4/2008 |
| JP | 2011164609 | 8/2011 |
| JP | 2012085360 | 4/2012 |
| JP | 2015007733 | 1/2015 |
| JP | 2019041204 | 3/2019 |
| JP | 2019155819 | 9/2019 |
| WO | 2019187751 | 10/2019 |

OTHER PUBLICATIONS

"International Search Report (Form PCT/ISA/210) of PCT/JP2021/001732," mailed on Mar. 30, 2021, with English translation thereof, pp. 1-5.

"Written Opinion of the International Searching Authority (Form PCT/ISA/237)" of PCT/JP2021/001732, mailed on Mar. 30, 2021, with English translation thereof, pp. 1-8.

Office Action of China Counterpart Application, with English translation thereof, issued on Jul. 29, 2023, pp. 1-18.

"Search Report of Europe Counterpart Application", issued on Jun. 21, 2023, pp. 1-8.

* cited by examiner

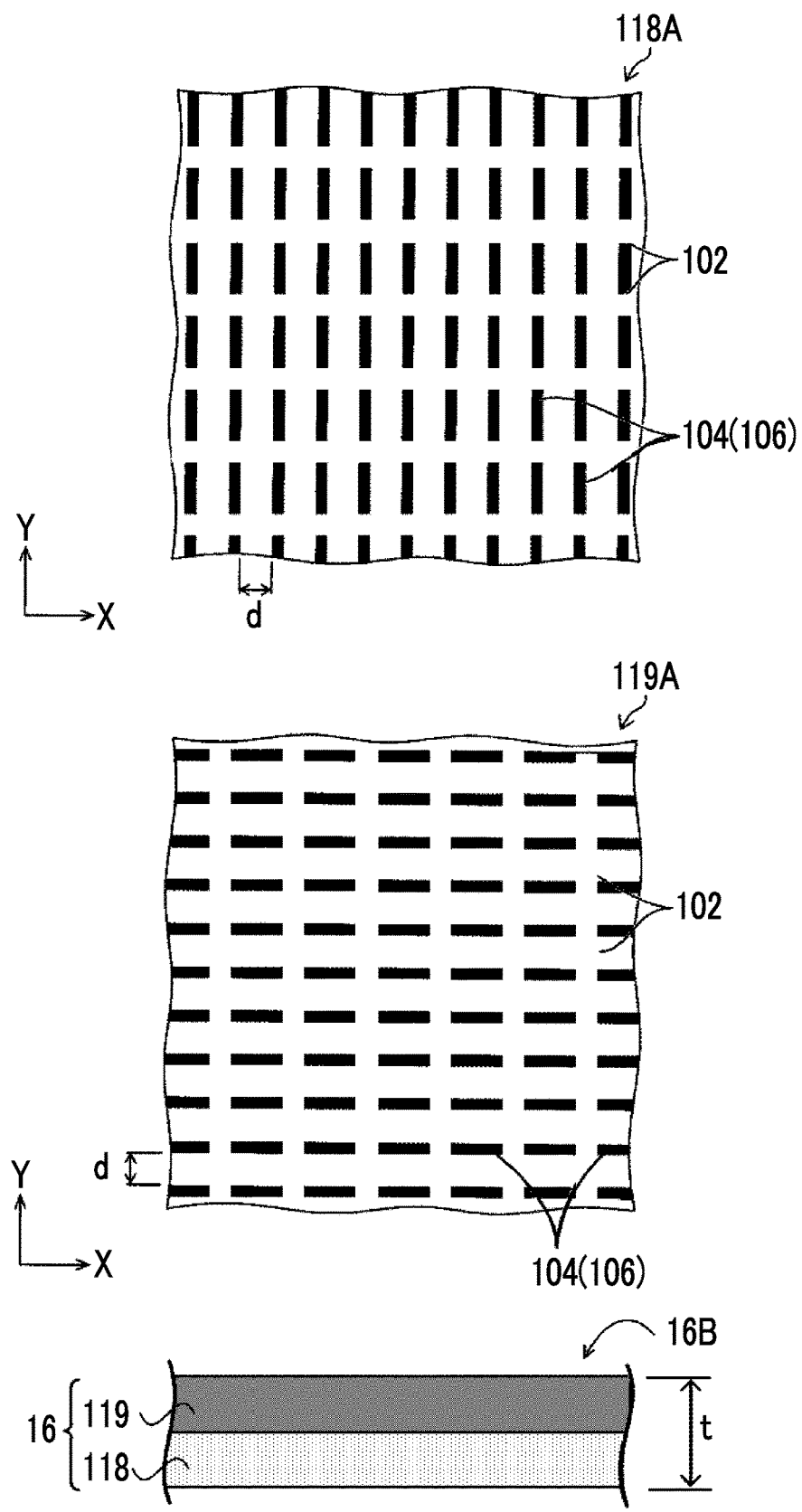

INFORMATION PROCESSING METHOD

CROSS REFERENCE TO RELATED APPLICATIONS

The present application is a Continuation of PCT International Application No. PCT/JP2021/001732, filed on Jan. 19, 2021, which claims priority to Japanese Patent Application No. 2020-011774, filed on Jan. 28, 2020. Each application above is hereby expressly incorporated by reference, in its entirety, into the present application.

BACKGROUND

Technical Field

The present disclosure relates to an information processing method.

Related Art

In the related art, there is disclosed a technique in which, in a case where an image displayed on an image display device is exposed on an exposure surface of a photosensitive recording medium, the photosensitive recording medium is irradiated with light emitted from the image display device parallel to each other with a collimator (see, for example, U.S. Pat. No. 9,126,396B).

Further, in an electrophotographic image forming device, there is disclosed a technique for correcting unevenness in the amount of light caused by manufacturing variation of an optical element. For example, JP2019-155819A discloses a technique in which a test image is printed, the printed test image is read, density correction data is obtained based on density data of the read test image, and the amount of light from a light source is adjusted based on the density correction data.

In the technique described in U.S. Pat. No. 9,126,396B, a louver film composed of a light transmission part and a light shielding part can be used as a collimator. However, in the louver film, the width between adjacent light shielding parts may not be constant due to manufacturing variation and the like. In a case where the image displayed on the image display device is exposed to the exposure surface of the photosensitive recording medium using such a louver film, the exposure surface of the photosensitive recording medium cannot be uniformly irradiated with light, and a recorded image recorded on the photosensitive recording medium may have density unevenness and streak unevenness.

SUMMARY

The present disclosure provides an information processing method capable of suppressing unevenness of recorded images.

According to a first aspect of the present disclosure, there is provided an information processing method comprising: exposing a correction image displayed on an image display device having a plurality of pixels to a photosensitive recording medium via a limiting member, the limiting member being provided between the image display device and an exposure surface of the photosensitive recording medium and limiting an angle of light emitted from the image display device to the photosensitive recording medium; acquiring recorded image data, which is data of a recorded image recorded on the photosensitive recording medium through the exposure of the correction image; and deriving a correction coefficient K for correcting a pixel value for each pixel of a display image for each pixel of the image display device based on the recorded image data such that the display image including unevenness of which brightness is complementary to unevenness that occur in the recorded image is displayed on the image display device.

In a second aspect of the present disclosure, according to the above aspect, the correction coefficient K may be derived using a pixel value Cr for each pixel of the recorded image and a reference pixel value Cs of the recorded image, which are derived based on the recorded image data.

In a third aspect of the present disclosure, according to the second aspect, the reference pixel value Cs may be an average value of the pixel values Cr for each pixel of the recorded image.

In a fourth aspect of the present disclosure, according to the second and third aspects, in a case where a predetermined constant is denoted by A, the correction coefficient K may be derived based on the following equation (1).

$$K=1-\{(Cr/Cs)-1\}\times A \tag{1}$$

In a fifth aspect of the present disclosure, according to the above aspects, the correction image may include an alignment pattern, the information processing method may further comprise modifying the recorded image data based on the alignment pattern such that a position of the recorded image indicated by the recorded image data and a position of the correction image match, and the correction coefficient K may be derived based on the recorded image data that has been modified.

In a sixth aspect of the present disclosure, according to the fifth aspect, the recorded image data may be modified such that centroid coordinates of the alignment pattern included in the recorded image indicated by the recorded image data match centroid coordinates of the alignment pattern included in the correction image.

In a seventh aspect of the present disclosure, according to the above aspects, the recorded image data may be acquired at a resolution equal to or higher than a resolution of the image display device.

In an eighth aspect of the present disclosure, according to the above aspects, the information processing method may further comprise correcting a pixel value Cb for each pixel of the display image using the correction coefficient K.

In a ninth aspect of the present disclosure, according to the eighth aspect, a pixel value Ca after correction of the display image may be derived based on the following equation (2).

$$Ca=Cb\times K \tag{2}$$

In a tenth aspect of the present disclosure, according to the above aspects, it is preferable that the correction image is a single color image.

In an eleventh aspect of the present disclosure, according to the fifth and sixth aspects, it is preferable that the correction image is a 50% gray image including four marks consisting of black squares having five pixels on each side as the alignment pattern.

In a twelfth aspect of the present disclosure, according to the fourth aspect, it is preferable that the constant A is 0.5 or more and 1.0 or less.

In a thirteenth aspect of the present disclosure, according to the seventh aspect, the recorded image data is acquired at a resolution equal to or higher than the resolution of the image display device, thereafter, the correction coefficient K may be derived based on the recorded image data in which the resolution of the recorded image data is matched with the resolution of the image display device.

According to the above aspect, the information processing method according to the present disclosure can suppress unevenness of the recorded image.

BRIEF DESCRIPTION OF THE DRAWINGS

FIG. 20 is a diagram showing a configuration of another example of the louver film.

DETAILED DESCRIPTION

Hereinafter, an information processing method according to an exemplary embodiment will be described with reference to the drawings.

Figure 1:
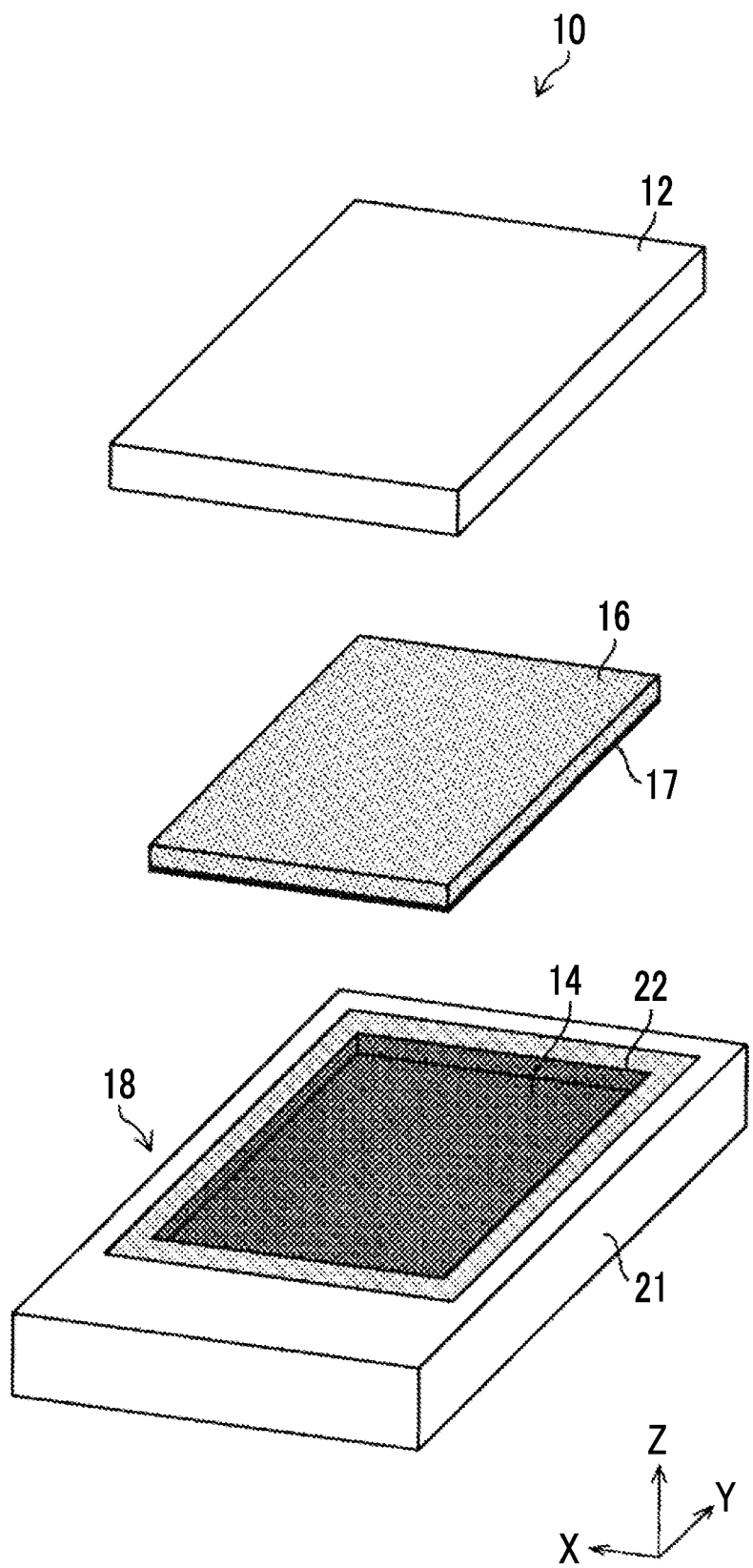
FIG. 1 is an exploded perspective view of an example of an image exposure device.

First, a configuration of an image exposure device 10 used in the information processing method according to the present exemplary embodiment will be described. FIG. 1 shows an exploded perspective view of an example of the image exposure device 10. Further, FIG. 2 shows a cross-sectional view of an example of the image exposure device 10.

Figure 2:
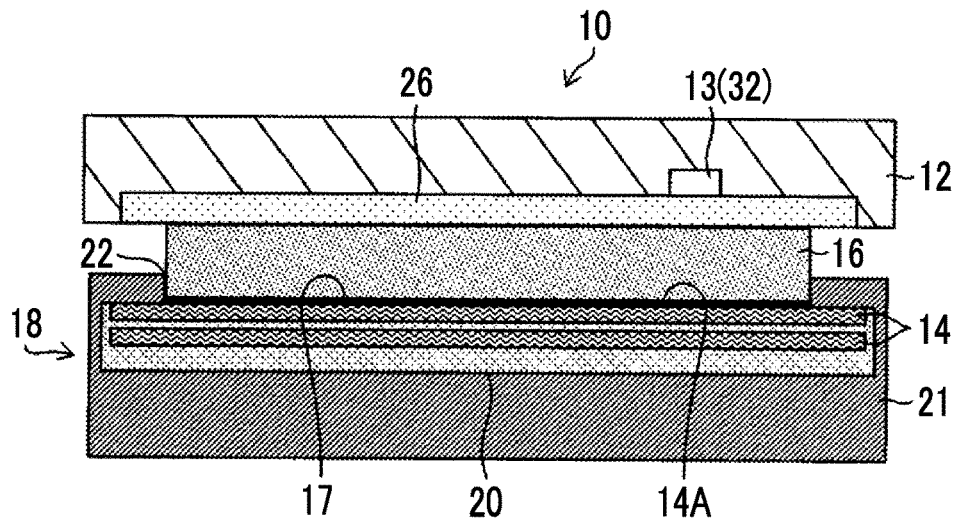
FIG. 2 is a cross-sectional view of an example of the image exposure device.

As shown in FIGS. 1 and 2, an image exposure device 10 comprises an image display device 12, a support portion 21, and a louver film 16. The image display device 12 has a plurality of pixels 13. The support portion 21 supports a photosensitive recording medium 14 on which a recorded image corresponding to a display image displayed by the image display device 12 is recorded. The louver film 16 is provided between the image display device 12 and the support portion 21, and a protective layer 17 is provided on the support portion 21 side thereof.

As the image display device 12, a mobile terminal such as a smartphone and a tablet PC, a liquid crystal display (LCD), an organic light emitting diode (OLED), a cathode ray tube (CRT), a light emitting diode (LED), a plasma display device, or the like can be used.

The image display device 12 comprises a plurality of pixels 13 as a display unit 32 for displaying a display image. FIG. 2 shows one pixel 13 as an example of the display unit 32. The pixel 13 is a minimum unit of color information constituting an image display surface. Since the pixel 13 is provided, the image display device 12 can display a display image.

Figure 3:
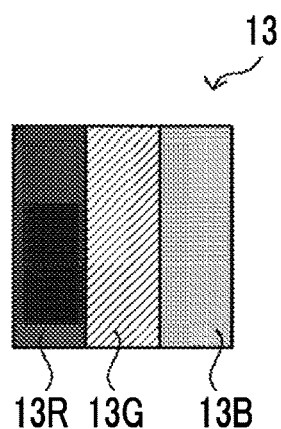
FIG. 3 is a diagram showing an example of a pixel of an image display device.

FIG. 3 shows an example of the pixel 13 according to the present exemplary embodiment. The pixel 13 includes three sub-pixels. Specifically, as shown in FIG. 3, in the pixel 13, a sub-pixel 13R corresponding to a red (R) color, a sub-pixel 13G corresponding to a green (G) color, and a sub-pixel 13B corresponding to a blue (B) color are disposed in a row. A plurality of pixels 13 are arranged two-dimensionally on a pixel display surface of the image display device 12. Since the pixel 13 is provided, the image display device 12 can display a color display image.

The two-dimensional in the arrangement of the pixels 13 means a state extending in X-Y directions in FIG. 1. By setting the distance (that is, pitch) between the adjacent pixels 13 to 200 μm or less, the impression of the recorded image as a natural image can be strengthened. Therefore, the pitch of the pixel 13 is preferably 150 μm or less, more preferably 125 μm or less, and even more preferably 85 μm or less.

A glass window 26 for protecting the pixel 13 is provided on a surface side irradiated with light from the image display device 12. The thickness of the glass window 26 is preferably thin in order to shorten the distance from the pixel 13 to the photosensitive recording medium 14.

The support portion 21 supports the photosensitive recording medium 14 in a state of being disposed at a position facing the surface irradiated with light from the image display device 12. The support portion 21 may directly or indirectly support the photosensitive recording medium 14, and the structure thereof is not particularly limited as long as the support portion 21 can support the photosensitive recording medium 14.

As shown in FIG. 2, the photosensitive recording medium 14 has an exposure surface 14A. The photosensitive recording medium 14 can be used without particular limitation as long as it is a recording medium that can be exposed to light emitted from the image display device 12 and can form a recorded image. For example, it is possible to use a film pack 18 or the like to be attached to an instant camera such as Instax (registered trademark), (trade name: Cheki) manufactured by Fujifilm Corporation.

The film pack 18 is formed by incorporating the photosensitive recording medium 14 into a case 20. A light shielding sheet (not shown) is provided between a plurality of the photosensitive recording mediums 14 provided in the case 20 and only the photosensitive recording medium 14 present on the uppermost surface of the film pack 18 is exposed by the light shielding sheet. In a case where the film pack 18 to be attached to the Instax (registered trademark) is applied, the photosensitive recording medium 14 and the light shielding sheet are incorporated in the film. As a material used for the photosensitive recording medium 14, for example, photographic light-sensitive materials such as a negative film, a reversal film, printing paper, and a mono-sheet or peel-apart type instant photographic film can be exemplified.

As shown in FIG. 2, a plurality of photosensitive recording medium 14 is packed in a box-like case 20 having light shielding properties. In the case 20, an exposure aperture 22 through which light emitted from the image display device 12 passes is provided in order to expose the exposure surface 14A of the photosensitive recording medium 14. In addition, a pressing member (not shown) is provided on the side opposite to the exposure aperture 22, and the photosensitive recording medium 14 is pressed toward the exposure aperture 22 side by using the pressing member. Therefore, the photosensitive recording medium 14 is pressed against the periphery of the exposure aperture 22, the distance from the image display device 12 becomes close, and a favorable image can be recorded on the photosensitive recording medium 14.

As the case 20, a resin member for a recording material that is used for various recording materials such as a photographic light-sensitive material, a magnetic recording material, and an optical recording material can be used. The resin member for the recording material refers to a case, a lid, and an accessory supplemented thereto which are used to contain, pack, coat, protect, transport, or store the recording material, and support the form of the recording material or various members that mount the recording material and exhibit a function.

The photosensitive recording medium 14 after exposure passes through between developing rollers (not shown), whereby a pod portion provided in the photosensitive recording medium breaks. A development treatment liquid is encompassed in the pod portion, and the breakage of the pod portion causes the development treatment liquid to spread in the photosensitive recording medium 14. After one to several minutes elapse, a development treatment is sufficiently advanced, and a recorded image is formed on the photosensitive recording medium 14.

Figure 4:
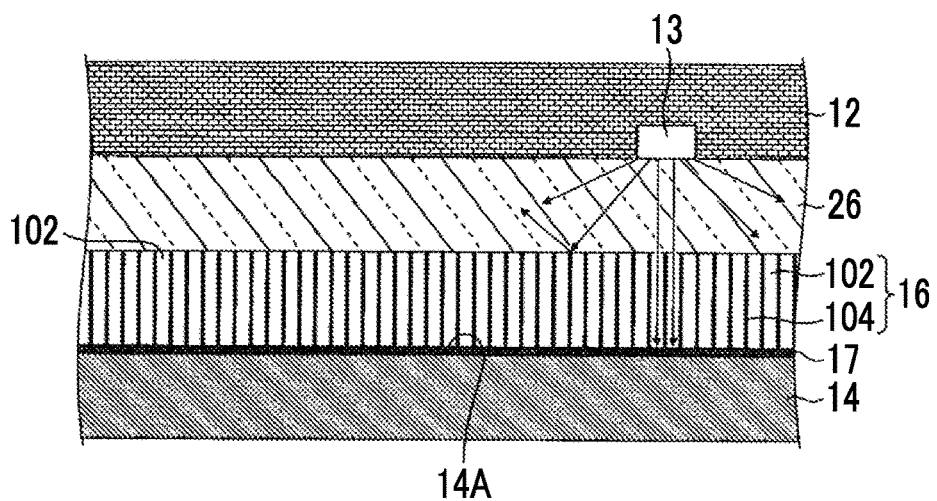
FIG. 4 is a schematic cross-sectional view for describing a traveling direction of light in the image exposure device.
Figure 5:
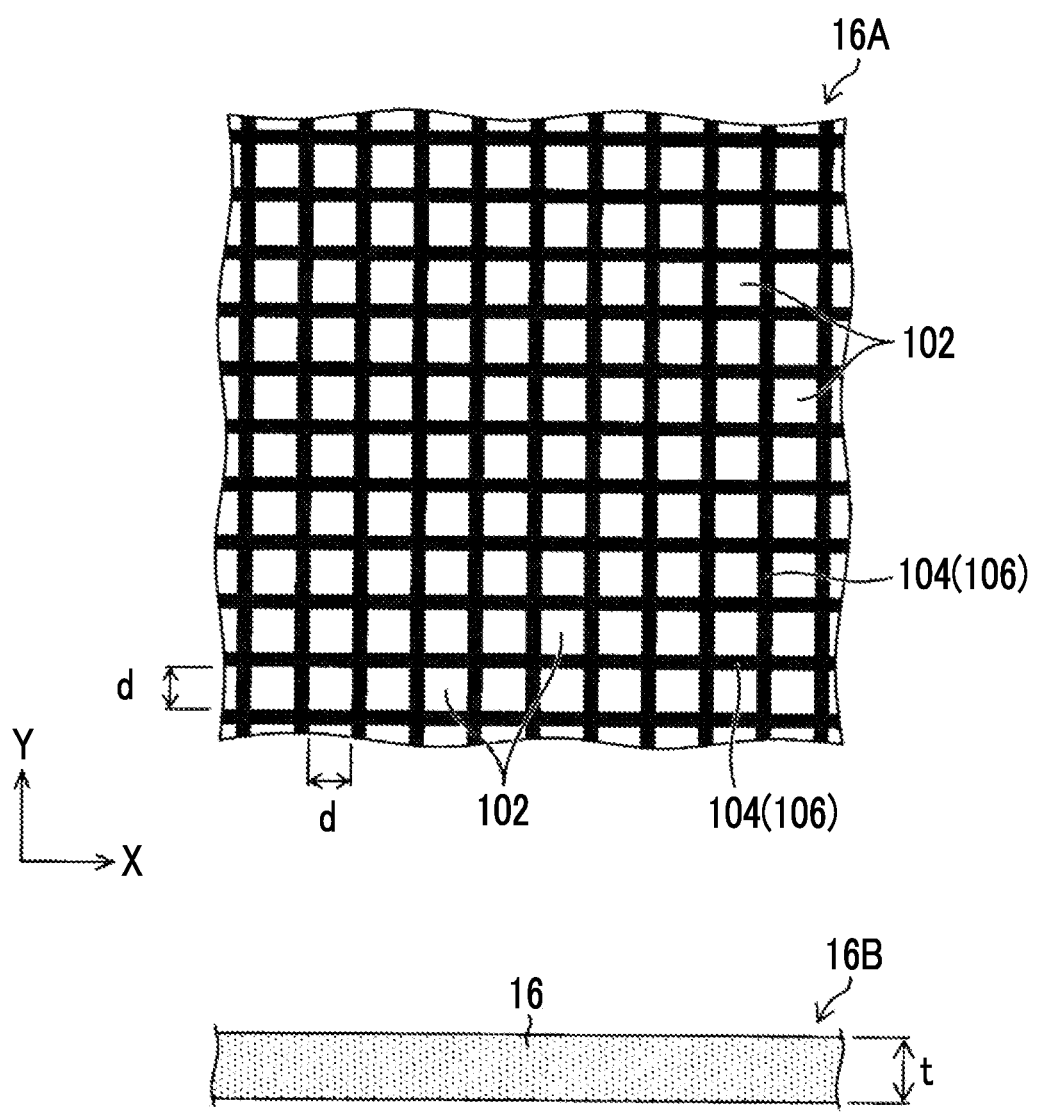
FIG. 5 is a diagram showing a configuration of an example of a louver film.

An example of the louver film 16 will be described with reference to FIGS. 4 and 5. FIG. 4 is a schematic cross-sectional view of an example of the image exposure device 10, and is a view for describing a traveling direction of light from the pixel 13. FIG. 5 is a diagram showing a configuration of an example of the louver film 16. Reference numeral 16A denotes a planar surface 16A of the louver film 16, and reference numeral 16B denotes a side surface 16B of the louver film 16.

In the louver film 16, light transmission parts 102 that transmit light and light shielding parts 104 that block light are alternately disposed in the first direction (X direction in the planar surface 16A in the example of FIG. 5) on a surface parallel to an arrangement surface where the pixels 13 of the image display device 12 are arranged. In addition, in the louver film 16, the light transmission parts 102 and the light shielding parts 104 are alternately disposed in the second direction (Y direction in the planar surface 16A in the example of FIG. 5) perpendicular to the first direction on the surface parallel to the surface where the pixels of the image display device are arranged.

In this way, in the present exemplary embodiment, the light transmission parts 102 are two-dimensionally disposed, and the light shielding parts 104 are formed in a lattice form. With such a configuration, the louver film 16 can limit an angle of light emitted from the pixel 13 of the image display device 12 to the exposure surface 14A of the photosensitive recording medium 14. The louver film 16 is an example of a limiting member of the present disclosure.

The light emitted from the pixel 13 of the image display device 12 is emitted in all directions of 180° from an image display surface. The emitted light passes through the glass window 26 provided in the image display device 12 and is incident on the louver film 16. In the light incident on the louver film 16, light parallel to a straight line connecting the image display device 12 and the photosensitive recording medium 14 passes through the light transmission parts 102 of the louver film 16. In addition, light emitted obliquely to the straight line connecting the image display device 12 and the photosensitive recording medium 14 is blocked by the light shielding parts 104 of the louver film 16. In this way, by limiting the angle of the light emitted from the image display device 12, the image quality of the recorded image recorded on the photosensitive recording medium 14 can be improved.

The light transmission parts 102 only need to be able to pass through light, and can be provided using a glass material, a transparent silicone rubber, or the like. In addition, portions of the light transmission parts 102 can be provided as cavities, and the louver film 16 can be composed of only the light shielding parts 104.

The light shielding parts 104 may be a light absorbing member that absorbs light, or a light reflecting member that reflects light. A light shielding member 106 constituting the light shielding parts 104 can use a colored resin material such as a black silicone rubber, for example. In addition, as the material that absorbs light, a neutral density filter (ND filter) can be used. The ND filter means a filter having a neutral optical density, and can absorb light evenly in a wavelength region used for exposure without giving an influence on the wavelength (specifically, absorbance of 50% or more and 99.999% or less and/or light transmittance of 0.001% or more and 50% or less).

A width d of the adjacent light shielding parts 104 of the louver film 16 is preferably 80 μm or less, and more preferably 65 μm or less. In a case where the width d is set to be in the above-described range, it is possible to block obliquely emitted light in light emitted from the pixel 13, and to improve the image quality of the recorded image.

A thickness t of the louver film 16 is preferably 1.5 mm or more and 4.0 mm or less, more preferably 2.0 mm or more and 4.0 mm or less, and still more preferably 2.5 mm or more and 4.0 mm or less. By increasing the thickness t of the louver film 16, oblique light at a small angle with respect to parallel light can be blocked. In addition, in a case where the thickness t of the louver film 16 is increased, the recorded image is likely to be blurred and thus, the thickness t of the louver film 16 is preferably in the above-described range.

The protective layer 17 is provided on the photosensitive recording medium 14 side of the louver film 16 as shown in FIGS. 1, 2, and 4. The protective layer 17 protects the louver film 16 in a case where the photosensitive recording medium 14 and the louver film 16 are in contact with each other during exposure. The protective layer 17 prevents the louver film 16 from being damaged or broken by repeated exposure of the display image displayed on the image display device 12 to the photosensitive recording medium 14.

As the protective layer 17, a transparent member capable of transmitting light can be used. For example, a plastic plate formed of an acrylic resin, a polycarbonate, a vinyl chloride resin, or the like can be used.

The thickness of the protective layer 17 is preferably 0.1 μm or more and 500 μm or less. In a case where the thickness of the protective layer 17 is set to 0.1 μm or more, it is possible to make moire inconspicuous in addition to the effect of protecting the louver film 16. In addition, it is possible to make an image defect generated based on the defect or the structure of the louver film 16 inconspicuous. Further, in a case where the thickness of the protective layer 17 is set to 500 μm or less, it is possible to prevent the recorded image recorded on the photosensitive recording medium 14 from being blurred.

Figure 6:
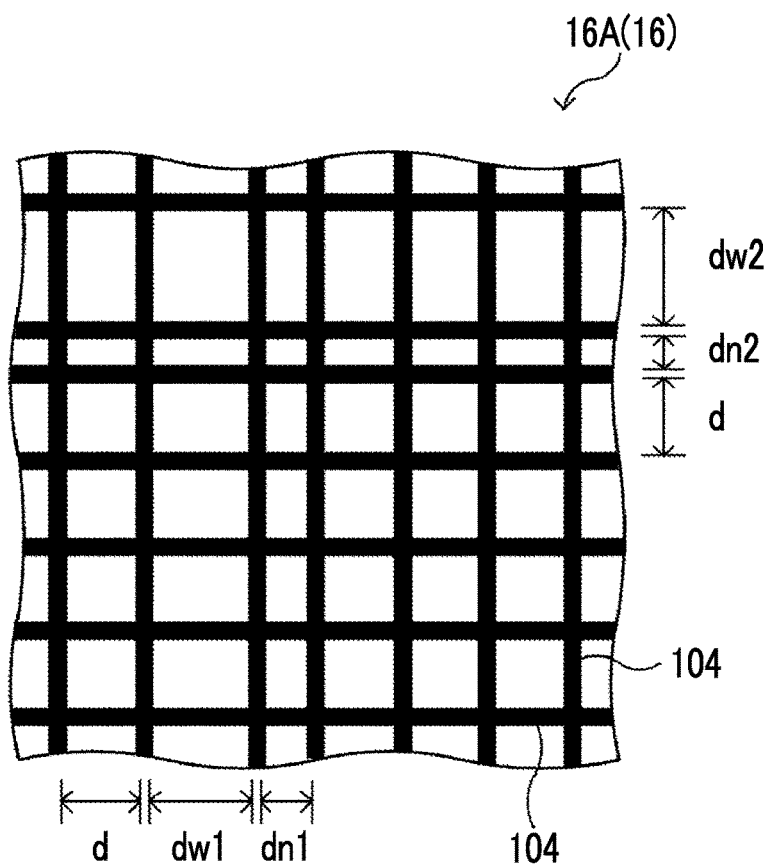
FIG. 6 is a diagram showing a configuration of an example of the louver film having variations in a width between light shielding parts.
Figure 7:
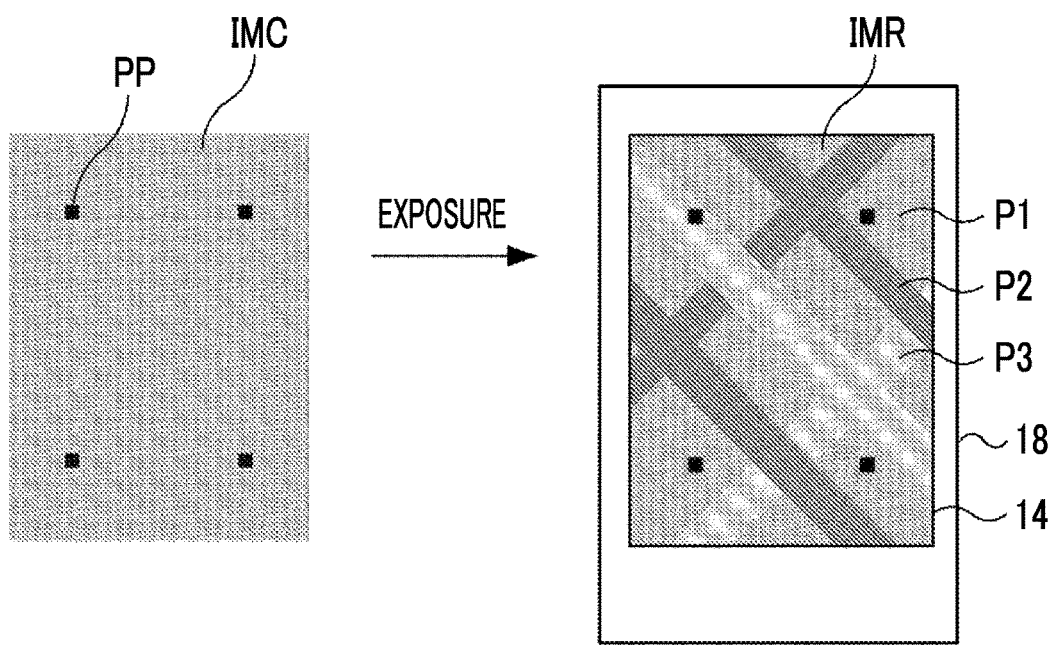
FIG. 7 is a diagram for describing an exposure step.

Incidentally, the width d between the adjacent light shielding parts 104 of the louver film 16 may not be constant due to manufacturing variation and the like. In addition, the position, number, degree, and the like where the variation appears may be different. FIG. 6 is a diagram showing a configuration of an example of the louver film 16 having variations in the width d between the light shielding parts 104. FIG. 7 is a diagram showing a recorded image (a recorded image IMR in the example of FIG. 7) obtained by exposing an image (a correction image IMC in the example of FIG. 7) displayed on the image display device 12 to the photosensitive recording medium 14 by using the louver film 16 having variations in the width d between the light shielding parts 104. FIG. 7 illustrates a case where a single color image is used as an image displayed on the image display device 12.

In the louver film 16 having variations in the width between the light shielding parts 104 as shown in FIG. 6, the angle of the light emitted from the pixel 13 of the image display device 12 to the exposure surface 14A of the photosensitive recording medium 14 cannot be uniformly limited, and the exposure surface 14A cannot be thus uniformly irradiated with the light. Therefore, the recorded image recorded on the photosensitive recording medium 14 using the louver film 16 having variations in the width between the light shielding parts 104 may have density unevenness and streak unevenness.

For example, in portions where the width between the light shielding parts 104 is narrow as in a width dn1 and a width dn2 shown in FIG. 6, since less light can be transmitted than in a portion having a normal width d, the recorded image formed on the photosensitive recording medium 14 becomes dark as shown in P2 of FIG. 7. Further, for example, in portions where the width between the light shielding parts 104 is wide as in a width dw1 and a width dw2 shown in FIG. 6, since more light is transmitted than in a portion having a normal width d, the recorded image formed on the photosensitive recording medium 14 becomes bright as shown in P3 of FIG. 7. Hereinafter, the density unevenness and the streak unevenness caused by the variation in the width between the light shielding parts 104 of the louver film 16 that occur in this recorded image are simply referred to as "unevenness".

In the information processing method according to the present exemplary embodiment, a correction coefficient K for performing a process of increasing (that is, brightening) the pixel value of the pixel 13 corresponding to a portion where dark unevenness appears in the recorded image in advance and of lowering (that is, darkening) the pixel value of the pixel 13 corresponding to a portion where bright unevenness appears in the recorded image is derived. According to such a process, unevenness of the recorded image can be suppressed even in the image exposure device 10 using the louver film 16 having variations in the width between the light shielding parts 104. Hereinafter, the information processing method according to the present exemplary embodiment will be described.

Figure 8:
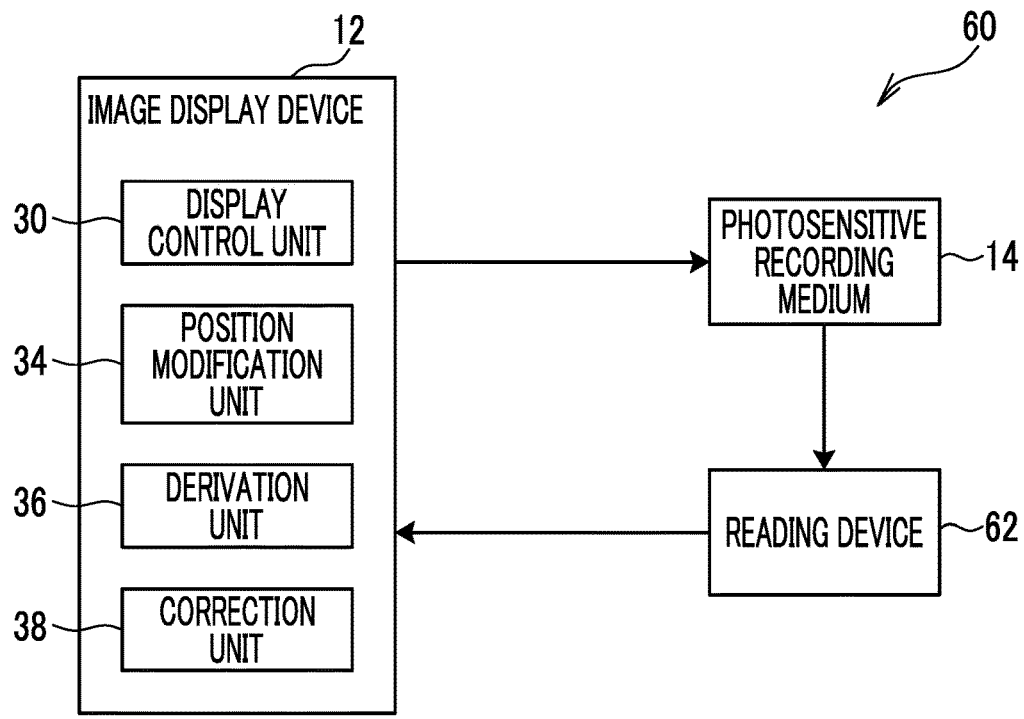
FIG. 8 is a block diagram showing an example of a configuration of an information processing system.

First, an example of an information processing system 60 used in the information processing method according to the present exemplary embodiment will be described with reference to FIG. 8. As shown in FIG. 8, the information processing system 60 comprises an image display device 12, a photosensitive recording medium 14, and a reading device 62. The image display device 12 comprises a display control unit 30, a position modification unit 34, a derivation unit 36, and a correction unit 38 as a functional configuration. The reading device 62 may be any device capable of acquiring data of the recorded image recorded on the photosensitive recording medium 14 (hereinafter referred to as "recorded image data IMD"), and for example, a scanner and a camera equipped with an imaging element such as a charge coupled device (CCD) can be used.

Figure 9:
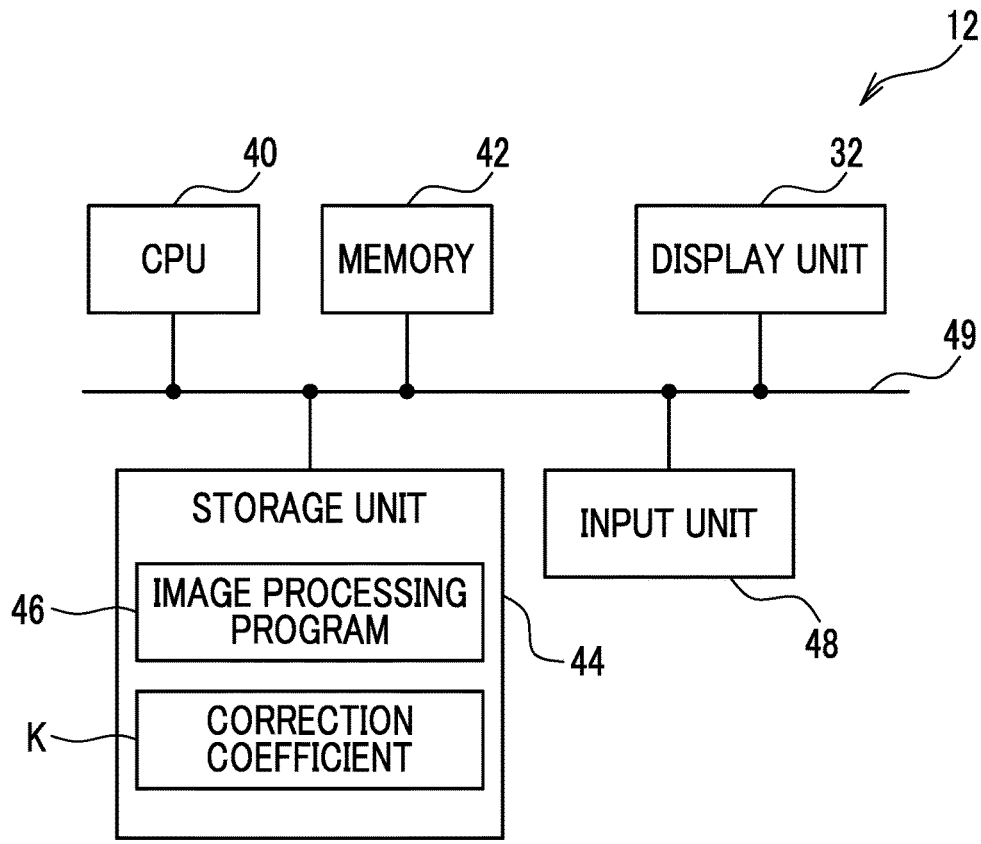
FIG. 9 is a diagram showing an example of a hardware configuration of an image display device.

Next, a hardware configuration of the image display device 12 will be described with reference to FIG. 9. As shown in FIG. 9, the image display device 12 comprises a central processing unit (CPU) 40, a memory 42 as a temporary storage area, and a nonvolatile storage unit 44. In addition, the image display device 12 comprises the display unit 32 described above and an input unit 48. The CPU 40, the memory 42, the storage unit 44, the input unit 48, and the display unit 32 are connected via a bus 49.

The display unit 32 comprises the above-described pixel 13 and radiates light according to the display image represented by the pixel 13. For the display unit 32, for example, a liquid crystal in which a lamp such as a backlight radiates light may be applied, or for example, a light emitting diode in which the display unit 32 itself radiates light may be applied.

The storage unit 44 is realized by a hard disk drive (HDD), a solid state drive (SSD), a flash memory, and the like. An image processing program 46 and a correction coefficient K are stored in the storage unit 44 as a storage medium. The CPU 40 reads the image processing program 46 from the storage unit 44, loads the read image processing program 46 in the memory 42, and then executes the image processing program 46. In a case where the CPU 40 executes the image processing program 46, the CPU 40 functions as the display control unit 30, the position modification unit 34, the derivation unit 36, and the correction unit 38 shown in FIG. 8.

Image data corresponding to the display image displayed on the display unit 32 is input to the input unit 48. The image data corresponding to the display image may be input from the outside of the image display device 12, or in a case where the image display device 12 or the image exposure device 10 has a function of forming or capturing an image, the image data formed or captured by the image display device 12 or the image exposure device 10 may be input. In addition, the recorded image data IMD acquired by the reading device 62 is input to the input unit 48.

Figure 10:
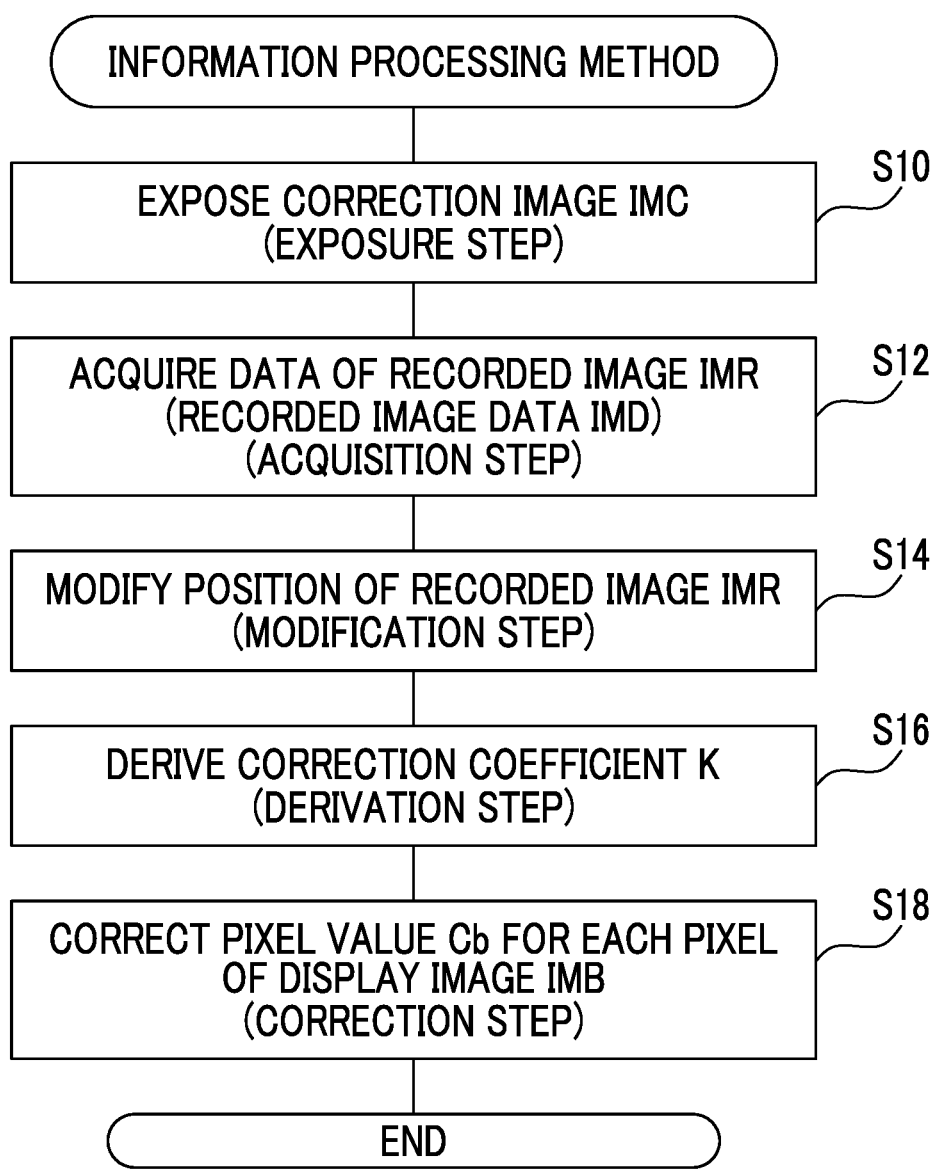
FIG. 10 is a flowchart of an example of an information processing method according to the present disclosure.
Figure 11:
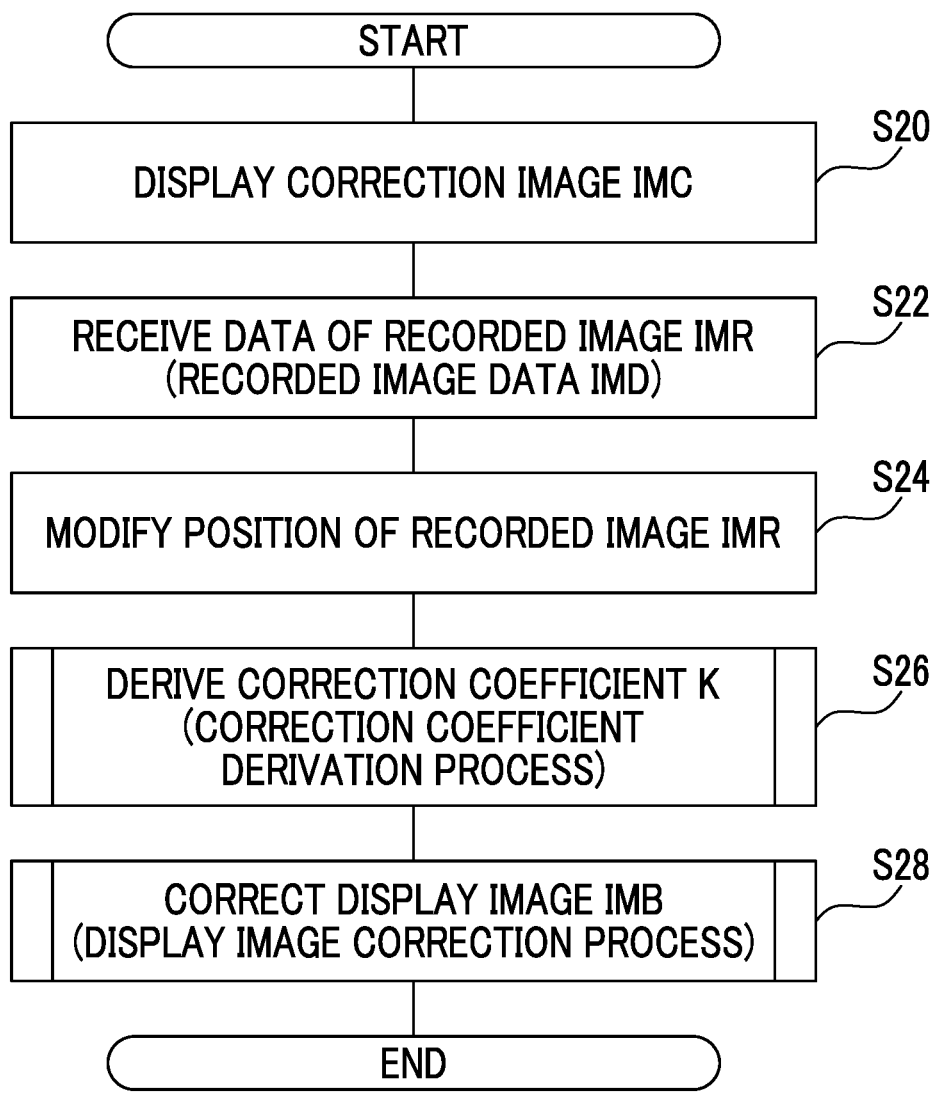
FIG. 11 is a flowchart of an example of an information process executed by the image display device.

Next, with reference to FIGS. 7 to 17, the information processing method according to the present exemplary embodiment using the information processing system 60 will be described. FIG. 10 is a flowchart showing an example of each step included in the information processing method according to the present exemplary embodiment. FIG. 11 is a flowchart of an example of processes executed by the image display device 12 according to each step included in the information processing method according to the present exemplary embodiment. Hereinafter, each step included in the information processing method according to the present exemplary embodiment will be described with reference to FIG. 10.

First, as shown in Step S10 of FIG. 10, in the exposure step according to the present exemplary embodiment, the correction image IMC displayed on the image display device 12 is exposed to the photosensitive recording medium 14 via the louver film 16. In the exposure step, the display control unit 30 performs control such that the correction image IMC as an example of the display image input to the input unit 48 is displayed on the display unit 32 (Step S20 in FIG. 11). Accordingly, as shown in FIG. 7, the recorded image IMR with unevenness is recorded on the photosensitive recording medium 14 supported by the image exposure device 10.

As shown in FIG. 7, the correction image IMC is preferably a single color image, and in particular, is more preferably a 50% gray (specifically, in a case where the R color, the G color, and the B color have 256 gradations, the pixel values of the R color, the G color, and the B color are 127) image. According to such a form, in the recorded image IMR, it can be seen that unevenness appears in the pixel having a pixel value deviating from the pixel value (that is, the reference pixel value Cs to be described later) corresponding to a predetermined pixel value of the correction image IMC. Therefore, in Step S16 of FIG. 10, which will be described later, the correction coefficient K corresponding to the unevenness in the recorded image MIR can be accurately derived.

Further, it is preferable that the correction image IMC includes an alignment pattern PP. As an example, FIG. 7 illustrates a correction image IMC including four marks consisting of black squares having five pixels on each side as the alignment pattern PP. The alignment pattern PP may be any pattern as long as it can detect the position of the recorded image MIR in the recorded image data IMD, and for example, marks such as a rectangle, a circle, a cross, and the like can be applied. Since the correction image IMC includes the alignment pattern PP, even if the recorded image IMR included in the recorded image data IMD acquired in Step S12 of FIG. 10 is deformed, the deformation of the recorded image MIR can be modified in Step S14 (details will be described below).

Figure 14A:
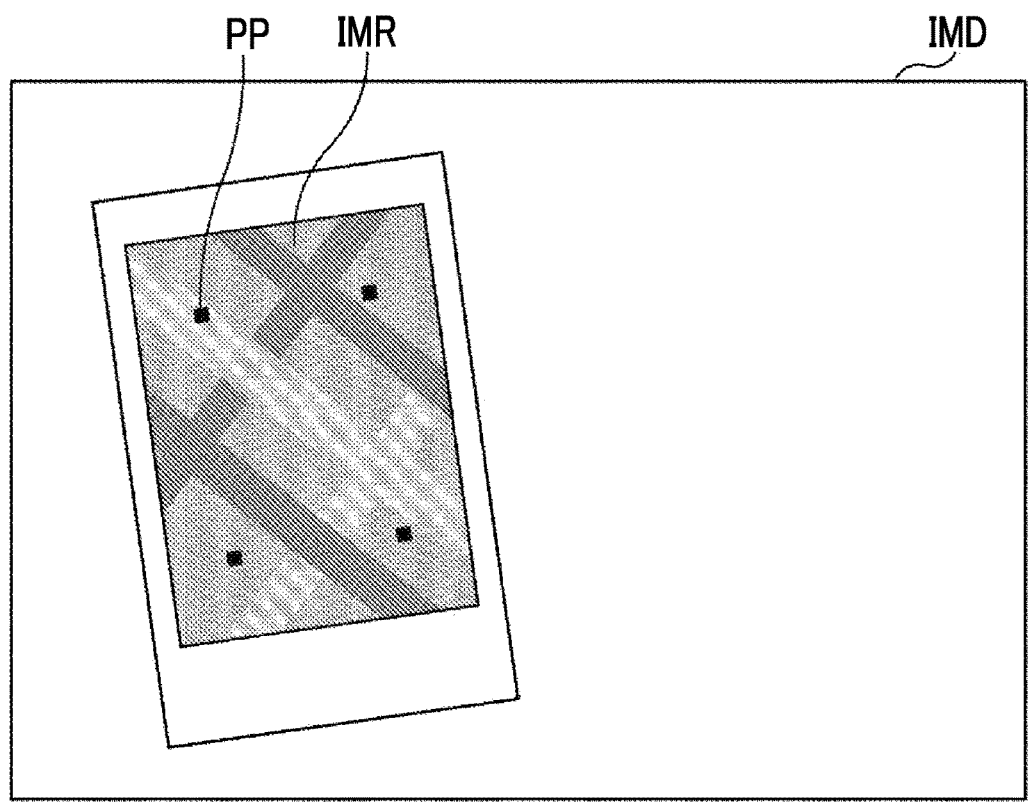
FIG. 14A is a diagram for describing an acquisition step and a modification step.

Next, as shown in Step S12 of FIG. 10, in the acquisition step according to the present exemplary embodiment, the recorded image data IMD, which is data of the recorded image MIR recorded on the photosensitive recording medium 14 through the exposure of the correction image IMC, is acquired. In the acquisition step, the reading device 62 acquires the data of the recorded image MIR (that is, the recorded image data IMD) as shown in FIG. 14A by reading the photosensitive recording medium 14 on which the recorded image MIR is recorded. Further, in the acquisition step, the image display device 12 receives the recorded image data IMD acquired by the reading device 62 via the input unit 48 (Step S22 in FIG. 11).

The recorded image MIR indicated by the recorded image data IMD may be deformed in various ways such as rotation, distortion, bending, and size. For example, FIG. 14A shows an example in which the recorded image MIR is rotated and the recorded image data IMD includes a region other than the recorded image IMR, such as the film pack 18 and a margin.

As shown in Step S14 of FIG. 10, in the modification step according to the present exemplary embodiment, the recorded image data IMD is modified based on the alignment pattern PP such that the position of the recorded image IMR indicated by the recorded image data IMD and the position of the correction image IMC match. Specifically, for each of the four alignment patterns PP, the recorded image data IMD is modified such that centroid coordinates of the alignment pattern PP included in the recorded image IMR indicated by the recorded image data IMD match centroid coordinates of the alignment pattern PP included in the correction image IMC.

Figure 14B:
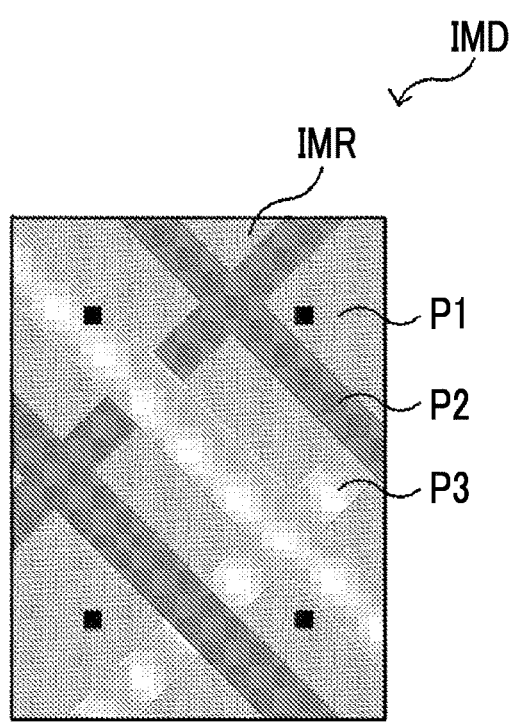
FIG. 14B is a diagram for describing an acquisition step and a modification step.

In the modification step, the position modification unit 34 associates the alignment pattern PP of the recorded image IMR with the alignment pattern PP of the correction image IMC for each of the four alignment patterns PP. Further, the position modification unit 34 modifies the recorded image data IMD by performing predetermined image processing such that the centroid coordinates of the associated alignment patterns PP match each other (Step S24 in FIG. 11). As the predetermined image processing, for example, various types of known image processing such as joint transformation, similarity transformation, affine transformation, projective transformation, and linear transformation can be applied. By these pieces of image processing, the recorded image MIR is subjected to deformation such as movement, rotation, enlargement, and reduction, and the pixels of the recorded image IMR can be associated with each pixel 13 of the image display device 12. By such processing, as shown in FIG. 14B, the deformation of the recorded image MIR indicated by the recorded image data IMD can be modified.

Figure 15A:
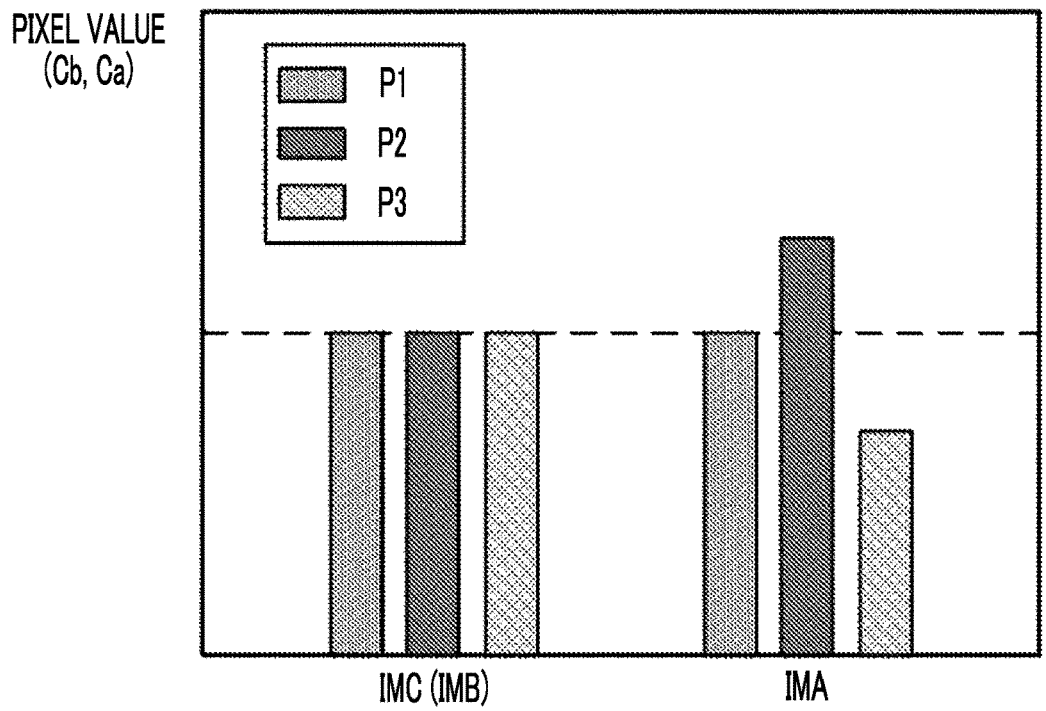
FIG. 15A is a diagram for describing a derivation step.
Figure 15B:
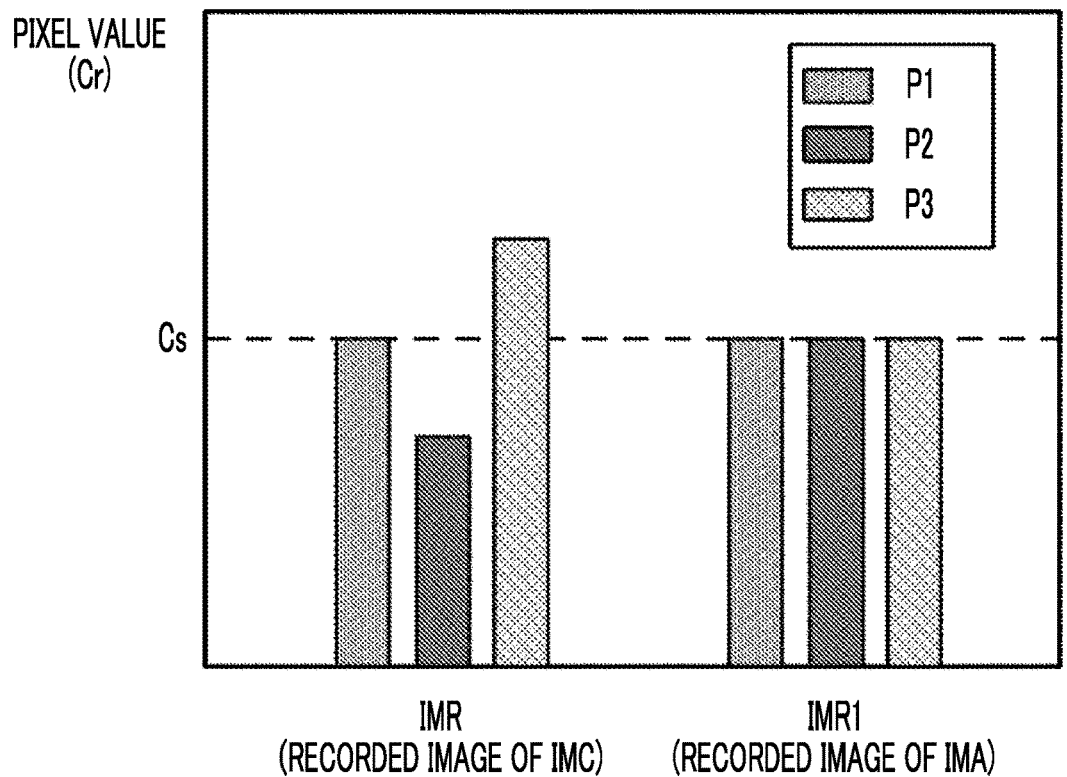
FIG. 15B is a diagram for describing a derivation step.
Figure 16:
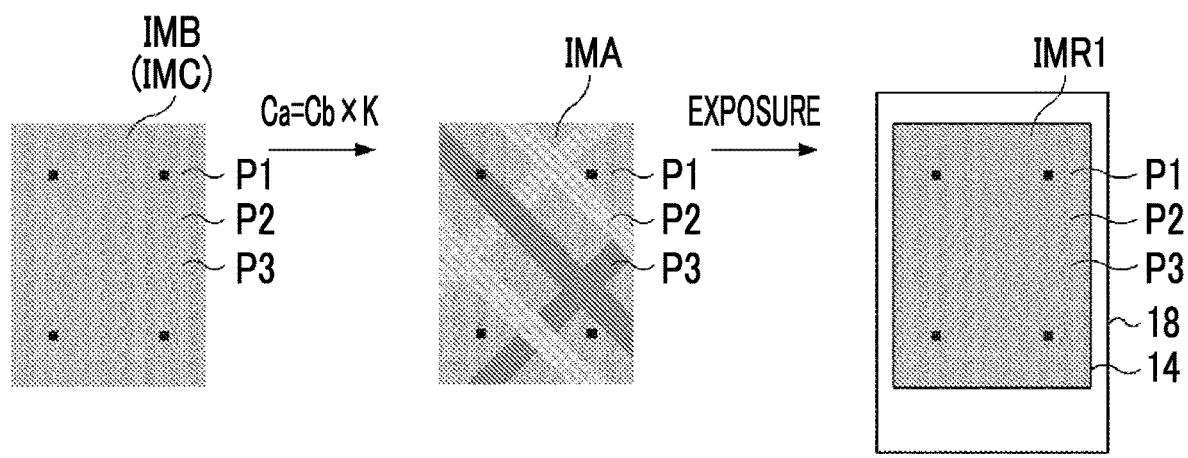
FIG. 16 is a diagram for describing a correction step.

Before describing the derivation step shown in Step S16 of FIG. 10, the correction coefficient K derived in the derivation step will be described with reference to FIGS. 15A, 15B, and 16. FIG. 15A is a diagram showing pixel values for each pixel of the correction image IMC and the corrected display image IMA displayed on the display unit 32 of the image display device 12. FIG. 15B is a diagram showing pixel values for each pixel of the recorded image MIR of the correction image IMC indicated by the recorded image data IMD and a recorded image IMR1 obtained by exposing the corrected display image IMA. FIG. 16 is a diagram showing an example of a display image IMB before correction represented by a pixel value Cb before correction, the corrected display image IMA represented by a pixel value Ca after correction, and the recorded image IMR1 obtained by exposing the corrected display image IMA to the photosensitive recording medium 14. FIG. 16 illustrates a case where the display image WM before correction is the same image as the correction image IMC.

As shown in FIG. 15B, the pixel value Cr of a portion P2 where the recorded image MIR becomes dark due to the variation in the width between the light shielding parts 104 of the louver film 16 is lower than the pixel value Cr of a portion P1 of normal brightness. Further, the pixel value Cr of a portion P3 where the recorded image MIR becomes dark due to the variation in the width between the light shielding parts 104 of the louver film 16 is higher than the pixel value Cr of the portion P1 of normal brightness.

Therefore, based on such a pixel value Cr for each pixel of the recorded image MIR, as shown in FIGS. 15A and 16, the display image IMA after correction is obtained, which is corrected such that unevenness of which brightness is complementary to unevenness due to the louver film 16 that occur in the recorded image IMR is included. "Unevenness of which brightness is complementary to unevenness that occur in the recorded image IMR" means the unevenness imparted to the corresponding portion of the display image IMA such that the portion brighter than the normal brightness is darker and the portion darker than the normal brightness is brighter, depending on the degree of deviation of the brightness portion that deviates from the normal brightness in the recorded image IMR. In the recorded image IMR1 obtained by exposing the corrected display image IMA corrected to include such unevenness, the unevenness included in the corrected display image IMA and the unevenness due to the louver film 16 are offset. Therefore, as shown in FIGS. 15B and 16, the pixel values of the portions P1, P2, and P3 can be made uniform. That is, in the recorded image IMR1 obtained by exposing the corrected display image IMA, the occurrence of unevenness can be suppressed.

The correction coefficient K is a coefficient for correcting the display image IMB before correction in order to obtain the corrected display image IMA such that the recorded image IMR1 in which the occurrence of unevenness is suppressed can be obtained. Specifically, the correction coefficient K is derived such that the pixel value Cr of the portion P2 where the recorded image MIR becomes dark is corrected to be higher than the pixel value Cr of the portion P1 of normal brightness and the pixel value Cr of the portion P3 where the recorded image MIR becomes bright is corrected to be lower than the pixel value Cr of the portion P1 of normal brightness. That is, the correction coefficient K is derived for each pixel 13 of the image display device 12 according to the characteristics of the unevenness due to the louver film 16. By using such a correction coefficient K, for the display image IMB before correction, the pixel value Cb of the portion P2 of the display image IMB before correction corresponding to the portion P2 where the recorded image IMR becomes dark can be corrected to be higher than the original pixel value and the pixel value Cb of the portion P3 of the display image IMB before correction corresponding to the portion P3 where the recorded image IMR becomes bright can be corrected to be lower than the original pixel value. Accordingly, it is possible to obtain the corrected display image IMA including unevenness of which brightness is complementary to unevenness due to the louver film 16.

As shown in Step S16 of FIG. 10, in the derivation step according to the present exemplary embodiment, the correction coefficient K is derived for each pixel 13 of the image display device 12 using the pixel value Cr for each pixel of the recorded image MIR and the reference pixel value Cs of the recorded image IMR, which are derived based on the recorded image data IMD modified in Step S14. In the derivation step, the derivation unit 36 performs a correction coefficient derivation process of deriving the correction coefficient K for each pixel 13 of the image display device 12 (Step S26 in FIG. 11).

Figure 12:
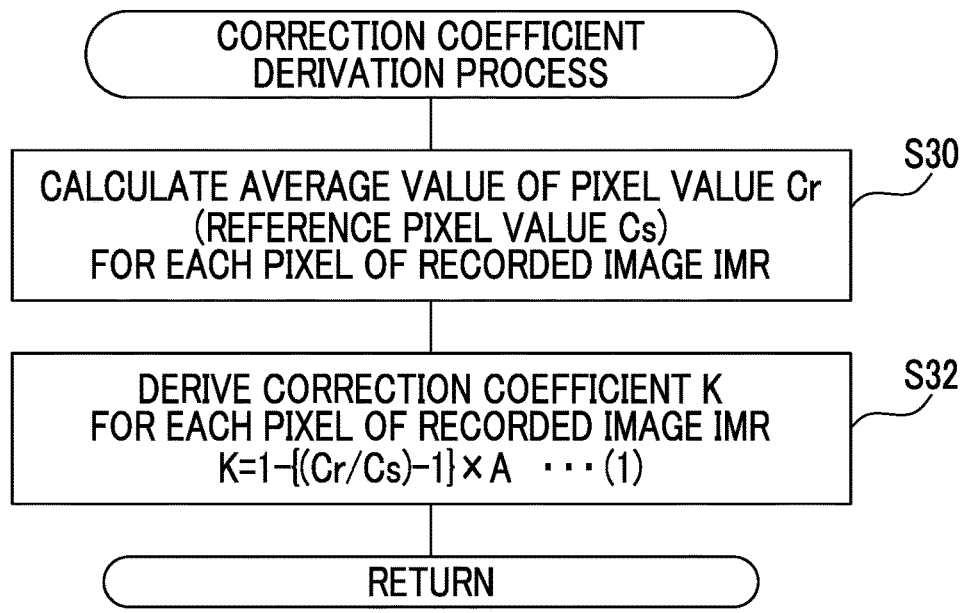
FIG. 12 is a flowchart of an example of a correction coefficient derivation process executed by the image display device.

The details of the correction coefficient derivation process will be described with reference to FIG. 12. FIG. 12 is a flowchart of an example of the correction coefficient derivation process. In Step S30, the derivation unit 36 calculates the average value of the pixel value Cr for each pixel of the recorded image IMR as the reference pixel value Cs.

In Step S32, the derivation unit 36 derives the correction coefficient K for each pixel of the recorded image IMR based on the following equation (1).

$$K=1-\{(Cr/Cs)-1\}\times A \quad (1)$$

Here, A is a predetermined constant, and is preferably 0.5 or more and 1.0 or less. By setting the constant A to a value of 0.5 or more and 1.0 or less, the unevenness of the recorded image IMR1 recorded on the photosensitive recording medium 14 can be appropriately suppressed in a case where the pixel value Cb for each pixel of the display image IMB is corrected by using the correction coefficient K.

The constant A is not limited to the value in the above range, and any value may be used as long as it can suppress the unevenness of the recorded image IMR1 recorded on the photosensitive recording medium 14 in a case where the pixel value Cb for each pixel of the display image IMB is corrected by using the correction coefficient K. In addition, the constant A may be a uniform value for each pixel or may be a different value for each pixel.

In a case where the process of Step S32 is completed, the correction coefficient derivation process is completed. The correction coefficient K derived by the correction coefficient derivation process is stored in the storage unit 44 as shown in FIG. 9.

Next, as shown in Step S18 of FIG. 10, in the correction step according to the present exemplary embodiment, the pixel value Cb for each pixel of the display image IMB is corrected by using the correction coefficient K stored in the storage unit 44. In the correction step, the correction unit 38 performs a display image correction process of correcting the pixel value Cb for each pixel of the display image IMB (Step S28 in FIG. 11).

Figure 13:
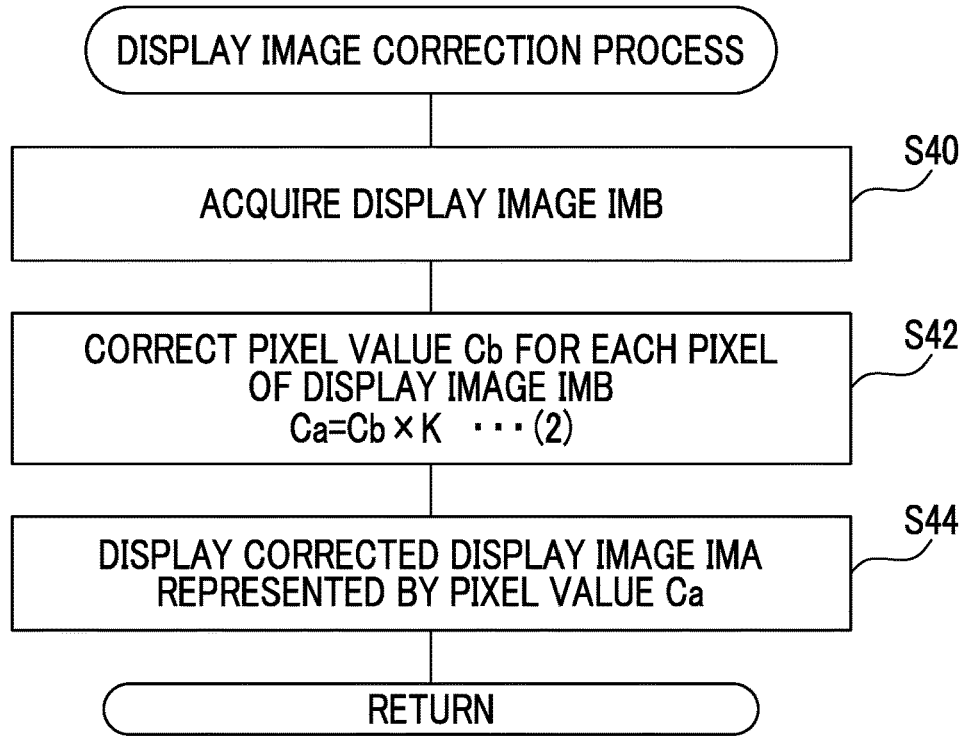
FIG. 13 is a flowchart of an example of a display image correction process executed by the image display device.

The details of the display image correction process will be described with reference to FIG. 13. FIG. 13 is a flowchart of an example of the display image correction process. In Step S40 of FIG. 13, the correction unit 38 acquires the display image IMB input to the input unit 48. In Step S42, the correction unit 38 corrects the pixel value Cb for each pixel of the display image IMB. Specifically, the corrected pixel value Ca is derived for each pixel value Cb of the display image IMB based on the following equation (2).

$$Ca=Cb\times K \quad (2)$$

In Step S44, the correction unit 38 causes the display control unit 30 to control to display the corrected display image IMA represented by the pixel value Ca derived in Step S42. In a case where the process of Step S44 is completed, the display image correction process is completed.

Figure 17:
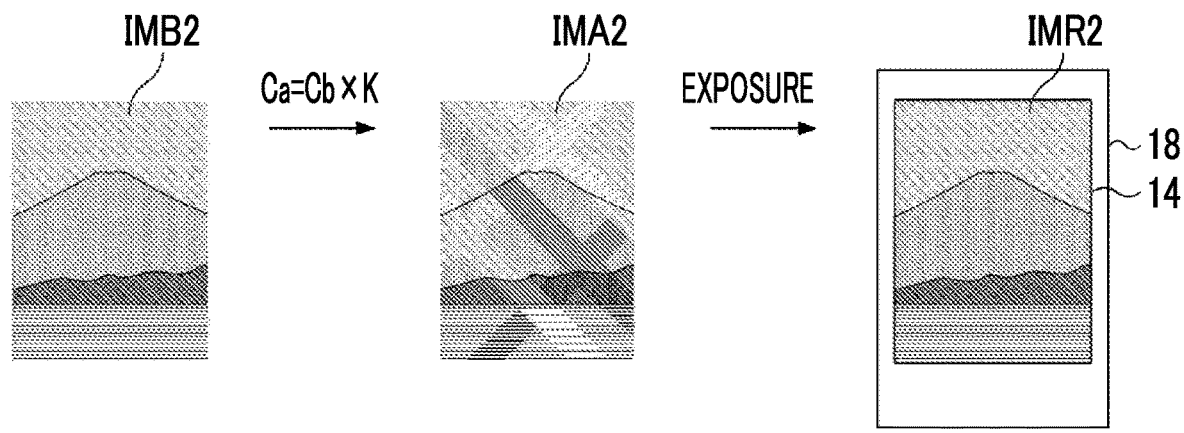
FIG. 17 is a diagram for describing a correction step.

FIG. 17 is a diagram showing an example of a case where the above-mentioned display image correction process is performed on a display image IMB2 different from the correction image IMC. With the information processing method according to the present exemplary embodiment, as shown in FIG. 17, even if the display image IMB2 has a different pixel value Cb for each pixel, the pixel value Cb can be appropriately corrected. Therefore, by exposing the photosensitive recording medium 14 using the display image IMA2 represented by the corrected pixel value Ca, unevenness of the recorded image IMR2 recorded on the photosensitive recording medium 14 can be suppressed.

As described above, the information processing method according to the present exemplary embodiment includes an exposure step of exposing the correction image IMC displayed on the image display device 12 having the plurality of pixels 13 to the photosensitive recording medium 14 via the louver film 16, the limiting member being provided between the image display device 12 and the exposure surface 14A of the photosensitive recording medium 14 and limiting an angle of light emitted from the image display device 12 to the photosensitive recording medium 14. Further, the information processing method according to the present exemplary embodiment includes an acquisition step of acquiring the recorded image data IMD, which is data of the recorded image MIR recorded on the photosensitive recording medium 14 through the exposure of the correction image IMC. Further, the information processing method according to the present exemplary embodiment includes a derivation step of deriving the correction coefficient K for correcting the pixel value Cb for each pixel of the display image based on the recorded image data IMD such that the display image including unevenness of which brightness is complementary to unevenness that occur in the recorded image IMR is displayed on the image display device 12.

By using the correction coefficient K derived by the information processing method according to the present exemplary embodiment, a display image in which the pixel value Cb is corrected so as to offset the density unevenness and the streak unevenness caused by the variation in the width between the light shielding parts 104 of the louver film 16 can be displayed on the image display device 12. Therefore, it is possible to suppress the unevenness of the recorded image obtained by exposing the display image displayed on the image display device 12 to the photosensitive recording medium 14.

In the acquisition step in Step S12 of FIG. 10, it is preferable to acquire the recorded image data IMD at a resolution equal to or higher than the resolution of the image display device 12. Further, in a case where the resolution of the recorded image data IMD exceeds the resolution of the image display device 12, in the derivation step in Step S12 of FIG. 10, it is preferable that the resolution of the recorded image data IMD is matched with the resolution of the image display device 12, and the correction coefficient K is derived based on the recorded image data IMD having the same resolution. By setting the resolution of the recorded image data IMD to be equal to or higher than the resolution of the image display device 12, even a small unevenness that appears in only one pixel of the image display device 12 can be read. Therefore, the correction coefficient K can be derived with high accuracy.

In a case where the recorded image MIR indicated by the recorded image data IMD acquired in the acquisition step in Step S12 of FIG. 10 is not deformed in various ways such as rotation, distortion, bending, and size, the modification step in Step S14 may be omitted. In this case, in the derivation step of Step S16, the correction coefficient K may be derived based on the unmodified recorded image data IMD. Further, in this case, the correction image IMC may not include the alignment pattern PP.

Further, in the modification step of Step S14 of FIG. 10, the recorded image data IMD may be modified such that the position of the recorded image MIR and the position of the correction image IMC match by using a known feature detection method such as an edge detection method. In this case, the correction image IMC may not include the alignment pattern PP.

Further, in the above exemplary embodiment, the form in which the image display device 12 comprises the position modification unit 34, the derivation unit 36, and the correction unit 38 has been described, but each of these may be configured by the image display device 12 and at least one other device. For example, the CPU of the smartphone as an example of the device different from the image display device 12 may function as the position modification unit 34 and the derivation unit 36 to derive the correction coefficient K. In this case, the correction coefficient K derived from the smartphone is stored in the storage unit 44 of the image display device 12, and the image display device 12 corrects the pixel value Cb for each pixel of the display image IMB by using the correction coefficient K stored in the storage unit 44. Further, for example, the CPU of the smartphone as an example of the device different from the image display device 12 may also function as the correction unit 38 to correct the display image IMB based on the derived correction coefficient K. In this case, the corrected display image IMA corrected by the smartphone is transmitted to the image display device 12, and the image display device 12 displays the received display image IMA after the correction.

Figure 18:
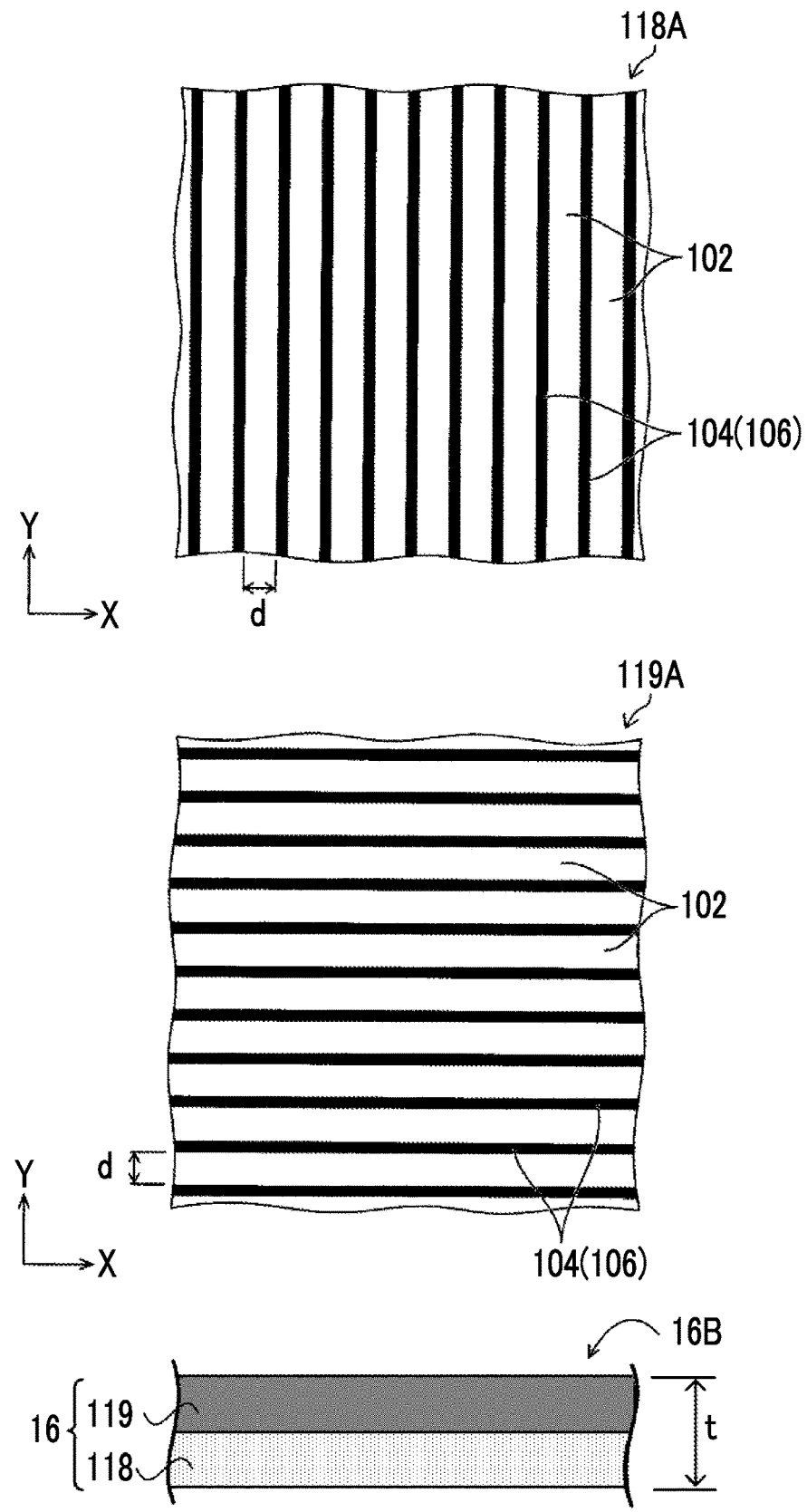
FIG. 18 is a diagram showing a configuration of another example of the louver film.
Figure 19:
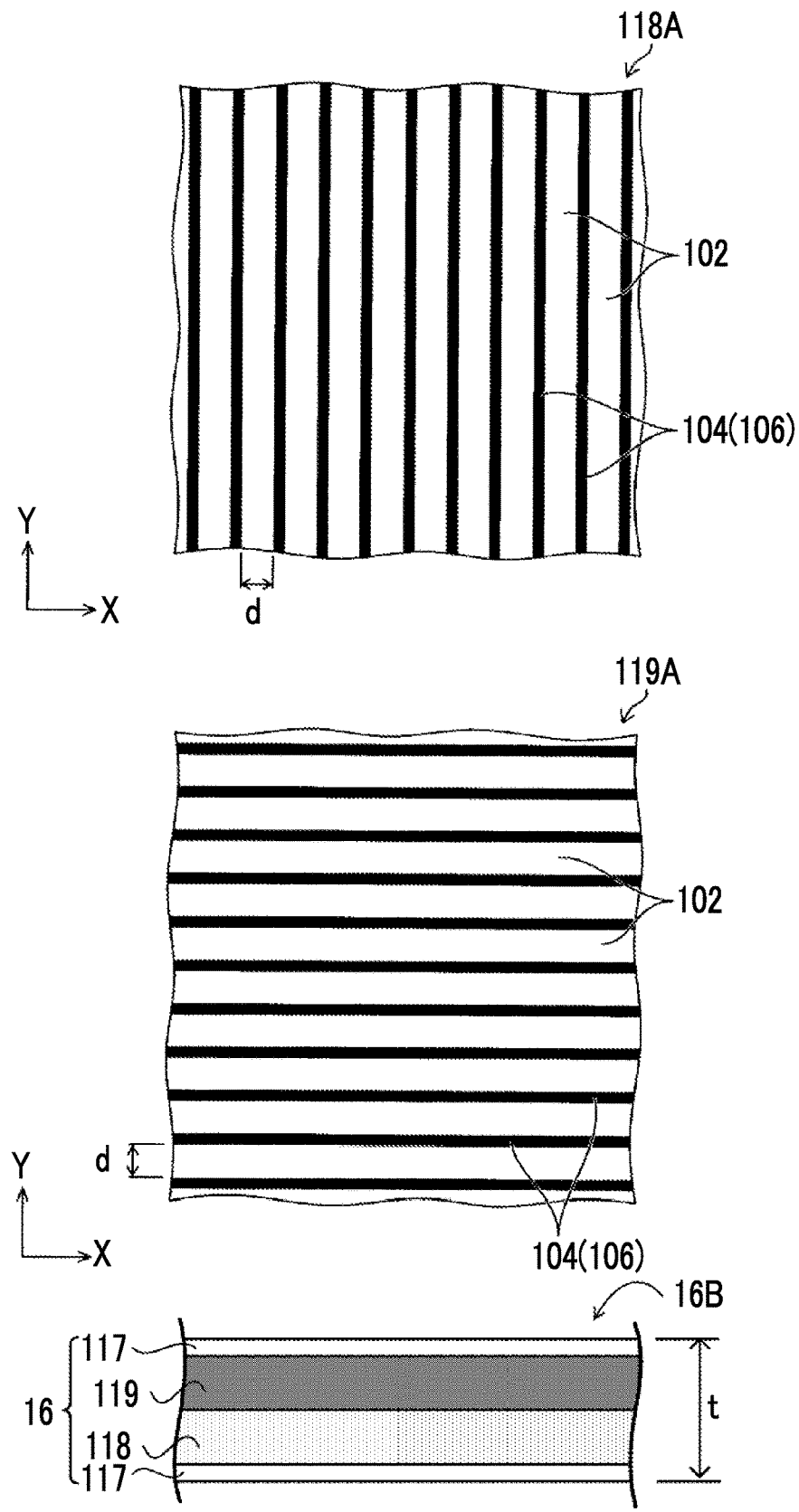
FIG. 19 is a diagram showing a configuration of another example of the louver film.

Further, the configuration of the louver film 16 is not limited to the form shown in FIG. 5. FIGS. 18 to 20 show configurations of another example of the louver film 16.

The louver film 16 shown in FIG. 18 is composed of two layers of a first layer 118 and a second layer 119. Reference numeral 16B denotes a side surface of the louver film 16, reference numeral 118A denotes a planar surface of the first layer 118, and reference numeral 119A denotes a planar surface of the second layer 119. As shown in the planar surface 118A of the first layer 118, in the first layer 118, the light transmission parts 102 and the light shielding parts 104 are alternately disposed only in the first direction (X direction in the planar surface 118A in the example of FIG. 18). In the second layer 119, the light transmission parts 102 and the light shielding parts 104 are alternately disposed only in the second direction perpendicular to the first direction (Y direction in the planar surface 119A in the example of FIG. 18). The first layer 118 and the second layer 119 are laminated to form a two-dimensional louver film 16. Thus, even in a case where the two-dimensional louver film 16 is formed with a plurality of layers, the same effect as that of the louver film 16 formed of one layer can be obtained.

Further, as shown in FIG. 19, the louver film 16 may have a form in which a protective layer 117 for preventing the louver film 16 from being damaged or broken is provided on the surface thereof. Specifically, the louver film 16 may have a form in which a protective layer 117 is provided on each of the planar surface 118A of the first layer 118 on the side opposite to the side in contact with the second layer 119 and the planar surface 119A of the second layer 119 on the side opposite to the side in contact with the first layer 118.

The protective layer 117 is not particularly limited as long as it is transparent and can transmit light. For the protective layer 117, for example, a plastic plate formed of an acrylic resin, a polycarbonate, a vinyl chloride resin, or the like can be used.

Further, as shown in FIG. 20, at least one of the light shielding parts 104 in each column and each row may be composed of a plurality of light shielding members 106 having intervals. In the example shown in FIG. 20, in the first layer 118, each column of light shielding parts 104 arranged along the first direction has a plurality of light shielding members 106 provided at predetermined intervals along the second direction. In the second layer 119, each row of light shielding parts 104 arranged along the second direction has a plurality of light shielding members 106 provided at predetermined intervals along the first direction.

In a case where the film is formed of a plurality of layers such as two layers of the first layer 118 and the second layer 119 as in the louver film 16 shown in FIGS. 18 to 20, the total thickness of the plurality of layers is the thickness t of the louver film 16.

The light shielding parts 104 may be disposed with a difference in an angle between XY axes of the pixel as a reference for the arrangement of the pixel 13 and an angle between XY axes of the louver as the reference for the arrangement of the light transmission parts 102 and the light shielding parts 104 of the louver film 16. Moire of the recorded image IMR is suppressed by disposing the pixel 13 with the difference in the angle between the XY axes of the pixel 13 and the XY axes of the louver. The difference of the angle is preferably 1 degree to 45 degrees, more preferably 5 degrees to 40 degrees, and even more preferably 10 degrees to 35 degrees.

Further, the structure of the louver film 16 is not limited to the FIGS. 5 and 18 to 20, and may be any limiting member capable of limiting the angle of the light emitted from the image display device 12. For example, the light transmission parts 102 and the light shielding parts 104 may be disposed aperiodically, and a capillary plate or the like in which holes are randomly formed may be used as the limiting member.

In the above exemplary embodiments, a mode in which each of the plurality of pixels 13 of the image display device 12 comprises sub-pixels 13R, 13G, and 13B to display a color image on the image display device 12 has been described, but the configuration of the image display device 12 for displaying the color image is not limited to this mode. For example, the image display device 12 may be provided with a light source or a filter corresponding to each of the R component, the G component, and the B component.

Further, as hardware structures of processing units that execute various kinds of processing such as each functional unit of the image display device 12 in the above exemplary embodiments, various processors shown below can be used. As described above, the various processors include a programmable logic device (PLD) as a processor of which the circuit configuration can be changed after manufacture, such as a field-programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (program).

One processing unit may be configured by one of the various processors, or configured by a combination of the same or different kinds of two or more processors (for example, a combination of a plurality of FPGAs or a combination of the CPU and the FPGA). In addition, a plurality of processing units may be configured by one processor. As an example where a plurality of processing units are configured by one processor, first, there is a form in which one processor is configured by a combination of one or more CPUs and software as typified by a computer, such as a client or a server, and this processor functions as a plurality of processing units. Second, as represented by a system on chip (SoC) or the like, there is a form of using a processor for realizing the function of the entire system including a plurality of processing units with one integrated circuit (IC) chip. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

In the above exemplary embodiment, the image processing program 46 is described as being stored (installed) in the storage unit 44 in advance; however, the present disclosure is not limited thereto. The image processing program 46 may be provided in a form recorded in a recording medium such as a compact disc read only memory (CD-ROM), a digital versatile disc read only memory (DVD-ROM), and a universal serial bus (USB) memory. In addition, the image processing program 46 may be downloaded from an external device via a network.

The disclosure of Japanese Patent Application No. 2020-011774 filed on Jan. 28, 2020 is incorporated herein by reference in its entirety. All literatures, patent applications, and technical standards described herein are incorporated by reference to the same extent as if the individual literature, patent applications, and technical standards were specifically and individually stated to be incorporated by reference.

What is claimed is:

1. An information processing method comprising:
    exposing a correction image displayed on an image display device having a plurality of pixels to a photosensitive recording medium via a limiting member, the limiting member being provided between the image display device and an exposure surface of the photosensitive recording medium and limiting an angle of light emitted from the image display device to the photosensitive recording medium;
    acquiring recorded image data, which is data of a recorded image recorded on the photosensitive recording medium through the exposure of the correction image; and
    deriving a correction coefficient K for correcting a pixel value for each pixel of a display image for each pixel of the image display device based on the recorded image data such that the display image including unevenness of which brightness is complementary to unevenness that occur in the recorded image is displayed on the image display device.

2. The information processing method according to claim 1, wherein the correction coefficient K is derived using a pixel value Cr for each pixel of the recorded image and a reference pixel value Cs of the recorded image, which are derived based on the recorded image data.

3. The information processing method according to claim 2, wherein the reference pixel value Cs is an average value of the pixel values Cr for each pixel of the recorded image.

4. The information processing method according to claim 2, wherein in a case where a predetermined constant is denoted by A, the correction coefficient K is derived based on the following equation (1), $$K=1-\{(Cr/Cs)-1\} \times A \qquad (1).$$

5. The information processing method according to claim 1, wherein:
    the correction image includes an alignment pattern,
    the information processing method further comprises modifying the recorded image data based on the alignment pattern such that a position of the recorded image indicated by the recorded image data and a position of the correction image match, and
    the correction coefficient K is derived based on the recorded image data that has been modified.

6. The information processing method according to claim 5, wherein the recorded image data is modified such that centroid coordinates of the alignment pattern included in the recorded image indicated by the recorded image data match centroid coordinates of the alignment pattern included in the correction image.

7. The information processing method according to claim 1, wherein the recorded image data is acquired at a resolution equal to or higher than a resolution of the image display device.

8. The information processing method according to claim 1, further comprising: correcting a pixel value Cb for each pixel of the display image using the correction coefficient K.

9. The information processing method according to claim 8, wherein a pixel value Ca after correction of the display image is derived based on the following equation (2), $$Ca=Cb \times K \qquad (2).$$

10. The information processing method according to claim 1, wherein the correction image is a single color image.

11. The information processing method according to claim 5, wherein the correction image is a 50% gray image including four marks consisting of black squares having five pixels on each side as the alignment pattern.

12. The information processing method according to claim 4, wherein the constant A is 0.5 or more and 1.0 or less.

13. The information processing method according to claim 7, wherein
the recorded image data is acquired at a resolution equal to or higher than the resolution of the image display device, thereafter
the correction coefficient K is derived based on the recorded image data in which the resolution of the recorded image data is matched with the resolution of the image display device.

\* \* \* \* \*